(12) United States Patent
Bailey (10) Patent No.: US 12,412,987 B2
(45) Date of Patent: Sep. 9, 2025

(54) DUAL FREQUENCY BAND DIRECTIONAL COUPLER WITH ENHANCED INSERTION LOSS

(71) Applicant: PPC BROADBAND, INC., East Syracuse, NY (US)

(72) Inventor: Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 360 days.

(21) Appl. No.: 17/993,742

(22) Filed: Nov. 23, 2022

(65) Prior Publication Data
US 2023/0163476 A1 May 25, 2023

Related U.S. Application Data

(60) Provisional application No. 63/283,002, filed on Nov. 24, 2021.

(51) Int. Cl.
| | |
|---|---|
| *H01Q 13/08* | (2006.01) |
| *H01P 5/18* | (2006.01) |
| *H04L 12/28* | (2006.01) |

(52) U.S. Cl.
CPC .............. *H01Q 13/08* (2013.01); *H01P 5/18* (2013.01); *H04L 12/2801* (2013.01)

(58) Field of Classification Search
CPC ........... H01Q 13/08; H01P 5/18; H01P 5/185; H04L 12/2801; H04N 7/104; H04B 3/56
See application file for complete search history.

(56) References Cited

U.S. PATENT DOCUMENTS

| | | | |
|---|---|---|---|
| 3,621,478 A | | 11/1971 | Johnson et al. |
| 5,382,925 A | * | 1/1995 | Hayashi ................... H03H 1/00 333/112 |
| 2003/0192063 A1 | | 10/2003 | Runkle |
| 2019/0230399 A1 | | 7/2019 | Bailey |
| 2021/0242558 A1 | | 8/2021 | Bailey |
| 2023/0361447 A1 | * | 11/2023 | Tamaru ..................... H01P 1/18 |

OTHER PUBLICATIONS

International Search Report and Written Opinion dated Mar. 6, 2023 in corresponding International Application No. PCT/US2022/050953, 17 pages.

* cited by examiner

*Primary Examiner* — Andrea Lindgren Baltzell
*Assistant Examiner* — Kimberly E Glenn
(74) *Attorney, Agent, or Firm* — MH2 Technology Law Group, LLP (57) ABSTRACT

A dual-frequency band coupled line directional coupler is configured to provide an enhanced insertion loss level. The directional coupler includes an input port, an output port, a coupled port, a termination port, and a capacitor element. A first track connects the input port to the output port and a second track, which may be substantially parallel to the first track, connects the termination port to the coupled port. A spacing between the capacitor element and the first track is configured to provide the enhanced insertion loss level between the input port and the output port.

32 Claims, 7 Drawing Sheets

DUAL FREQUENCY BAND DIRECTIONAL COUPLER WITH ENHANCED INSERTION LOSS

CROSS-REFERENCE TO RELATED APPLICATION

This application claims priority to U.S. Provisional Patent Application No. 63/283,002, filed on Nov. 24, 2021, the disclosure of which is incorporated herein by reference in its entirety.

BACKGROUND

Data Over Cable Service Interface Specification (DOCSIS) is an international telecommunications standard that permits the addition of high-bandwidth data transfer to an existing cable television (CATV) system. DOCSIS is used by many cable television operators to provide Internet access over their existing hybrid fiber-coaxial (HFC) infrastructure. The Multimedia over Coax Alliance (MoCA) is an international standards consortium that publishes specifications for networking over coaxial cable. DOCSIS may be useful for providing network content via home cable TV subscriber devices (e.g., digital video recorders (DVRs), set-top boxes, digital television tuners, etc.). Also, MoCA may be useful to allow network devices and/or home cable TV subscriber devices to communicate with each other over a wired coaxial connection.

MoCA filtering is a technique used to prevent communications between devices in a home network from exiting the home network and reaching the CATV network or external network. Such filtering is often used to preserve the privacy of the communications occurring within the home network and more specifically, to prevent communications, intended only for devices within the home network, from leaving the home network and being observable from outside the home network.

A challenge in using Docsis to provide cable TV and Ethernet signals to and from the home and MoCA signals for networking of data within the home when using a Docisis-MoCA directional coupler is providing sufficient isolation between the cable signals and the Internet or other signals and the MoCA signals and controlling insertion loss and return loss within the home. An additional challenge is preventing noise funneling of interference signals in the Docsis band escaping from the home where the aggregate sum noise from multiple homes could degrade the CATV signals in the network. Many in home cable architectures now use products that help to improve isolation between CATV access network signals and In-home network signals while also suppressing or minimizing noise ingress. These problems may also arise when utilizing a dual frequency band directional coupler using frequency band other than the Docsis frequency band and the MoCA frequency band

SUMMARY

In some embodiments, a dual-frequency band directional coupler is configured to provide an enhanced insertion loss. The dual-frequency band directional coupler includes an input port, an output port, a coupled port, and a termination port, a first track configured to connect the input port with the output port, a second track configured to connect the termination port with the coupled port, and a reactance including a capacitor element, the capacitor element having a plate disposed substantially parallel to the first track. A spacing between the plate of the capacitor element and the first track is configured to provide an enhanced insertion loss level between the input port and the output port that is less than a predetermined insertion loss level.

In some embodiments, the predetermined insertion loss level is 1.5 dB in a frequency band of 5-1800 MHz. In some embodiments, the reactance further includes a series inductance disposed at an end of the first track.

In some embodiments, a dual frequency band directional coupler is configured to provide an enhanced insertion loss, an enhanced return loss and an enhanced isolation. The dual frequency band directional coupler includes an input port, an output port, a coupled port, and a termination port, a first track configured to connect the input port with the output port, a second track configured to connect the termination port with the coupled port, a reactance including a capacitor element, the capacitor element having a plate disposed substantially parallel to the first track, and a high pass filter disposed at an end of the second track. A spacing between the plate of the capacitor element and the first track is configured to provide an enhanced insertion loss level between the input port and the output port that is less than a predetermined insertion loss level at a first frequency band and to provide an enhanced return loss level between the input port and the output port that is greater than a predetermined return loss level. The high pass filter is configured to provide an enhanced isolation level between the input port and the coupled port that is greater than a first predetermined isolation level at a second frequency band. The predetermined insertion loss level is about 1.5 dB and the first frequency band is about 5-1800 MHz, and the predetermined return loss level is about 18 dB.

In some embodiments, the first predetermined isolation level is about 35 dB and the second frequency band is about 700-1800 MHz. In some embodiments, the reactance further comprises a series inductance disposed at an end of the first track In some embodiments, a Docsis-MoCA directional coupler is configured to provide an enhanced insertion loss, an enhanced return loss and an enhanced isolation. The Docsis-MoCA directional coupler includes an input port, an output port, a coupled port, and a termination port, a first track configured to connect the input port with the output port, a second track configured to connect the termination port with the coupled port, a reactance including a capacitor element and an inductance, the capacitor element having a plate disposed substantially parallel to the first track and the inductance being a series inductance disposed at an end of the first track and a high pass filter disposed at an end of the second track. A spacing between the plate of the capacitor element and the first track and a size of the series inductance are configured to provide an enhanced insertion loss level between the input port and the output port that is less than a predetermined insertion loss level at a first frequency band and to provide an enhanced return loss level between the input port and the output port that is greater than a predetermined return loss level. The high pass filter is configured to provide an enhanced isolation level between the input port and the coupled port that is greater than a predetermined isolation level at a second frequency band The predetermined insertion loss level is about 1.5 dB and the first frequency band is about 5-1800 MHz, and the predetermined return loss level is about 18 dB.

It will be appreciated that this summary is intended merely to introduce some aspects of the present embodiments, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Aspects of the present disclosure may include a dual-frequency band directional coupler and a Docsis-MoCA coupled line directional coupler that improves the performance of high frequency band and hybrid and MoCA only communications by improving insertion loss, return loss and isolation between the ports. Further, the performance of the dual frequency band directional coupler and the Docsis-MoCA coupled line directional coupler may be adjusted or set when the dual-frequency band directional coupler or Docsis-MoCA coupled line directional coupler is manufactured, as further explained herein.

As described herein, the Docsis-MoCA coupled line directional coupler has improved Docsis frequency band (e.g., 5-1800 MHz) and MoCA frequency band (e.g., 1125-1675 MHz) performance. In some embodiments, the Docsis-MoCA coupled line directional coupler described herein may have a design that improves the insertion loss, return loss and directional isolation in the Docsis and MoCA frequency bands (e.g., 5-1800 MHz & 1125-1675 MHz) as well as other frequency bands relative to traditional directional couplers. Similar performance enhancements are achieved in the dual-frequency band directional coupler.

As described herein, in some embodiments, the Docsis-MoCA coupled line directional coupler may include an input port, an output port, a coupled port and a termination port, a first track connecting the input port to the output port, and a second track substantially parallel to the first track (for at least a portion of the length of the tracks) connecting the termination port to the coupled port. Reactances integrated with the coupler may include a capacitor element which may be disposed substantially parallel to the first track. In some embodiments, the reactance may include an inductance located at the end of the first track. A spacing between the capacitor plate and the first track and a size of the inductance track may be configured to provide an insertion loss level between the input port and the output port that is less than a predetermined insertion loss level at a first frequency band. In some embodiments, the predetermined insertion loss level may about 1.5 dB and the first frequency band may about 5-1800 MHz, although the spacing or size could be modified to produce different insertion loss levels. In some embodiments, the spacing between the capacitor plate and the second track may be about 12 mil and the size of the inductance track may be 215 mil long by 12 mil wide. However, a different spacing and/or size could be used to produce different insertion loss levels. Additionally, the capacitance and inductance may be configured to improve In-Out Insertion Loss<1.5 dB, In-Out Return Loss>18 dB and In-Cpld Isolation>35 dB technically across the entire first band and second band effectively increasing the bandwidth of the first band to 1800 MHz. In some embodiments the capacitance and inductance may be configured to provide the return loss greater than 20 dB.

In some embodiments, the Docsis-MoCA coupled line directional coupler may include a high pass filter configured to provide an isolation level between the input port and the coupled port that is greater than a first predetermined isolation level at a second frequency band. In some embodiments, the first predetermined isolation level may be about 35 dB and the second frequency band may be about 700-1800 MHz, although the high pass filter may be configured to provide other isolation levels in the same or other frequency bands.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
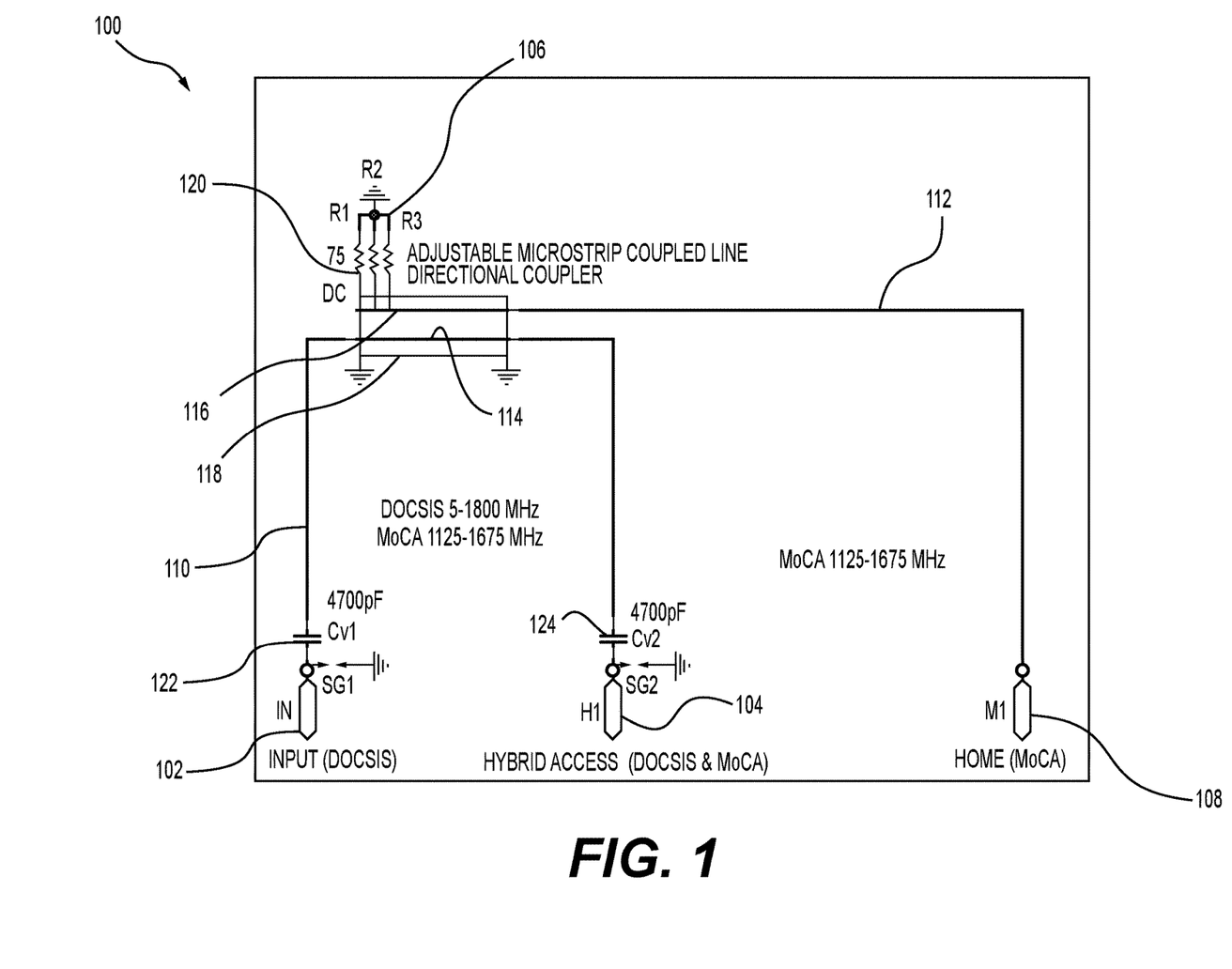
FIG. 1 illustrates an example Docsis-MoCA coupled line directional coupler in accordance with aspects of the present disclosure.

FIG. 1 illustrates an example Docsis-MoCA coupled line directional coupler 100 (or dual-frequency band directional coupler 100 using high and low frequency bands) in accordance with aspects of the present disclosure. The Docsis-MoCA coupled line directional coupler 100 of FIG. 1 may include an input port 102, an output port 104, a termination port 106 and a coupled port 108. The input port may be configured to receive input signals, which in some embodiments may be Docsis signals. The Docsis signals may be signals in a frequency band of 5-1800 MHz, although other frequency bands could be utilized (other than the 5-1800 MHz Docsis frequency band). For example, the directional coupler 100 could be configured to receive low frequency band signals at input port 102, where the low frequency band signals could be at a different frequency band then the 5-1800 MHz Docsis frequency band, such as a low frequency band of 100 MHz to 1000 MHz.

A resistor (or a plurality of resistors) 120 may be connected between the termination port 106 and a ground. The input port 102 is connected to the output port 104 by a first track 110 and the termination port 106 is connected to the coupled port 108 by a second track 112.

The Docsis-MoCA coupled line directional coupler 100 may be configured to receive a signal, such as an incoming or "downstream" cable TV or other signal (such as an Internet signal), at the input port 102 and output the cable TV or other signal (such as the Internet signal) at the output port 104. Additionally, the coupled port 108 is configured to couple MoCA signals to the hybrid output port 104 while isolating MoCA signals from the input port 102. In some embodiments, the output port 104 may be a hybrid output port that outputs both the cable TV or other signals and a MoCA data signal. The directional coupler 100 is configured to allow communication of MoCA signals in the MoCA frequency band of 1125 MHz to 1675 MHz between the output port 104 and the coupled port 108. In some embodiments, the directional coupler may be configured to utilize a frequency band other than the MoCA frequency band of 1125 MHz to 1675 MHz. For example, instead of the MoCA frequency band of 1125 MHz to 1675 MHz, the directional coupler could be configured to enable communication of high frequency band signals between the hybrid output port 104 and the coupled port 108. In some examples, the high frequency band could be a frequency band centered around 2.4 GHz, such as a frequency band of 2.3 to 2.5 GHz, although other frequency bands could be used. In some embodiments, the low frequency band and the high frequency band may overlap, while in other embodiments, the low frequency band and the high frequency band do not overlap. In such embodiments of a dual-frequency band directional coupler The Docsis-MoCA coupled line directional coupler 100 may include a portion (coupled portion) 114 of the first track 110 that is coupled to a portion 116 of the second track 112. A ground plane 118 may be disposed parallel to the first track 110. Capacitors 122 and 124 may be disposed along the first track 110.

Figure 2:
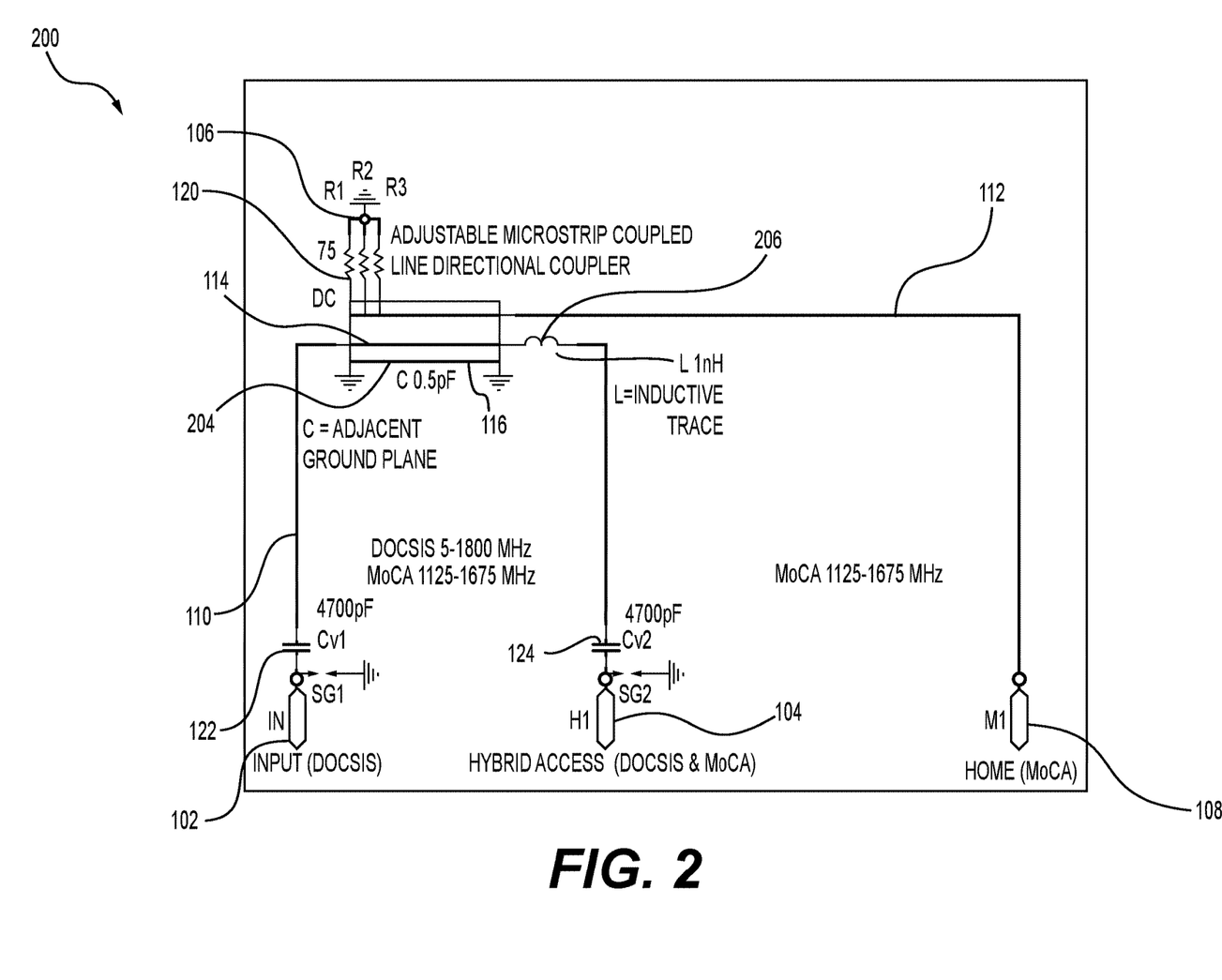
FIG. 2 illustrates an example Docsis-MoCA coupled line directional coupler in accordance with aspects of the present disclosure.

FIG. 2 illustrates an example Docsis-MoCA coupled line directional coupler 200 in accordance with aspects of the present disclosure. Like elements of the Docsis-MoCA coupled line directional coupler 200 as compared to the Docsis-MoCA coupled line directional coupler 100 of FIG. 1 have the same reference numerals. The Docsis-MoCA coupled line directional coupler 200 may be configured as a dual-frequency band coupled line directional coupler as discussed herein in conjunction with the embodiment of FIG. 1.

The Docsis-MoCA coupled line directional coupler 200 is configured to provide an enhanced insertion loss level between the input port 102 and the output port 104. In some embodiments, the enhanced insertion loss level between the input port 102 and the output port 104 is set to be less than a predetermined insertion loss level by a reactance. In some embodiments, the reactance may include a capacitor 118. In some embodiments, the predetermined insertion loss level may be provided by setting a spacing between the first track 110 and a plate of capacitor 118. In one example, the enhanced insertion loss between the input port 102 and the output port 104 may be set to less than 1.5 dB (although different levels of insertion loss may be used). In some embodiments, the enhanced insertion loss level of less than 1.5 dB may be improved to extend the Docsis frequency band to 5-1800 MHz, as compared to conventional directional couplers. In some embodiments, the reactance may include the capacitance and an inductance provided by inductor 206 that may be configured to improve In-Out Insertion Loss<1.5 dB, In-Out Return Loss>18 dB and In-Cpld Isolation>35 dB technically across the entire first band and second band effectively increasing the bandwidth of the first band to 1800 MHz. In some embodiments, the capacitance and inductance may be configured to provide the return loss>20 dB.

The insertion loss and return loss levels between the input port 102 and the output port 104 may be set by adjusting a spacing between the first track 110 and the plate of capacitor 204 and by adjusting the size of the inductance track at the end of the first track 110. In some embodiments, the spacing between the first track 110 and the plate of capacitor 204 may be set to be about 12 mil and the inductance track size may be 215 mil by 12 mil, although different spacings and track sizes could be used. In some embodiments, the Docsis-MoCA coupled line directional coupler 200 may be connected to test equipment capable of measuring the insertion loss level and the capacitor and track spacing can be adjusted until the desired insertion loss level is achieved.

In some embodiments, in addition to the spacing between the first track 110 and the capacitor 118 and the size of the inductance track, other factors may affect the herein-described insertion loss level. However, if these other factors are fixed, the insertion loss level may be adjusted based on a change in the spacing between the first track 110 and the capacitor 118 and the size of the inductance track. In some embodiments, the size of the inductance track may be fixed and the insertion loss level may be adjusted based on a change in the spacing between the first track 110 and the plate of capacitor 118.

The inductor 206 may have a value of 1 nH, although other inductance values could be used. The inductance 206 may be provided by increasing the trace length of the first track 110 to 1200 mil, for example. The inductance has the effect of improving isolation between the input port 102 and the coupled port 108 at a frequency band of about 5 MHz to 1800 MHz. The isolation between the input port 102 and the coupled port 108, for example, in the frequency band of about 700 MHz to 1800 MHz is greater than about 35 dB. The capacitance and inductance may be used together to effect change to insertion loss, return loss and isolation.

The width of the first track may be 14 mil, for example. Additionally, capacitor 204 may have a capacitance of 0.5 pF, although other capacitance values could be used.

Figure 3:
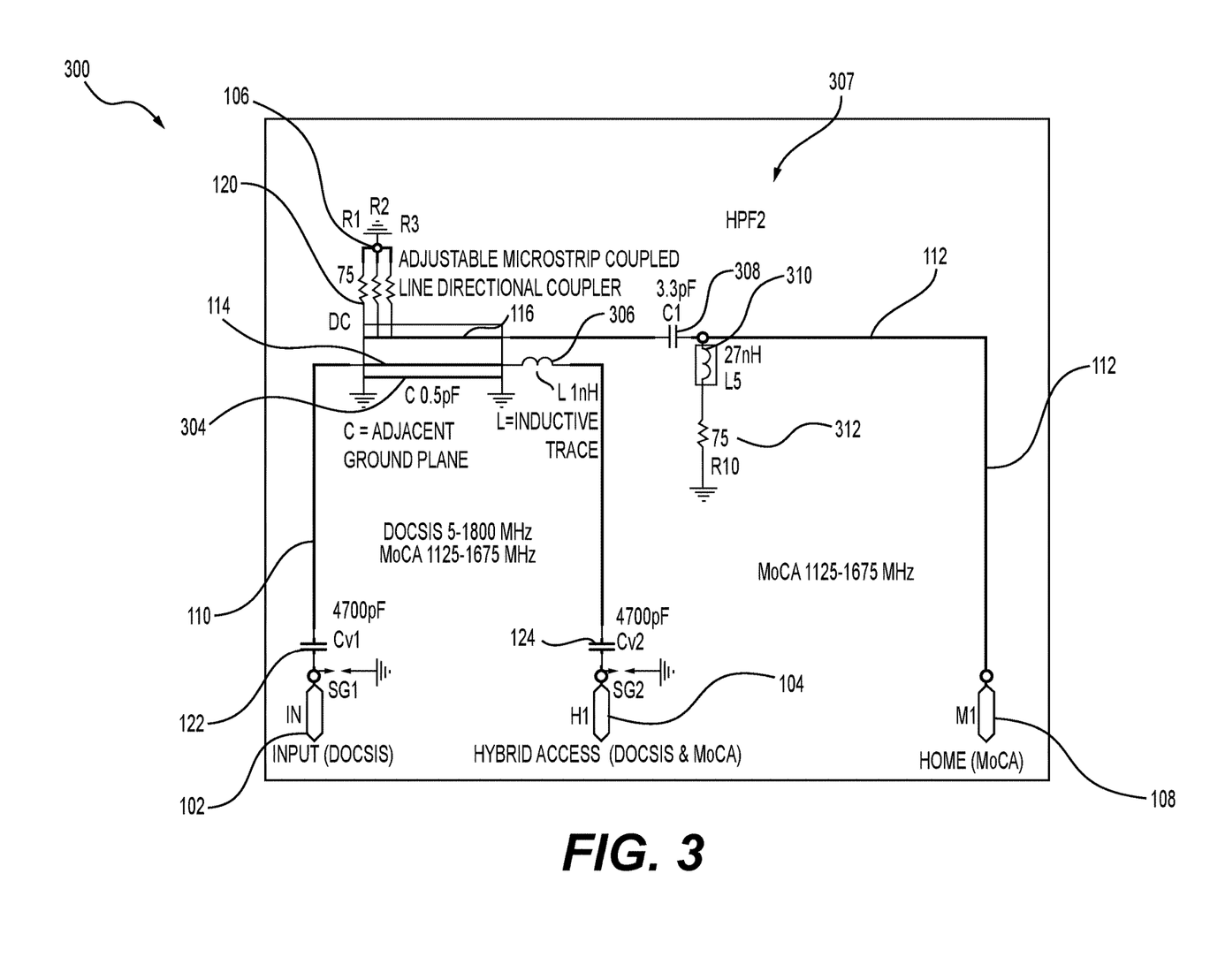
FIG. 3 illustrates a top view of an example PCB design for a Docsis-MoCA coupled line directional coupler in accordance with aspects of the present disclosure.

FIG. 3 illustrates an example Docsis-MoCA coupled line directional coupler 300 in accordance with aspects of the present disclosure. The Docsis-MoCA coupled line directional coupler 300 may be configured as a dual-frequency band coupled line directional coupler as discussed herein in conjunction with the embodiment of FIG. 1. Like elements of the Docsis-MoCA coupled line directional coupler 300 as compared to the Docsis-MoCA coupled line directional couplers 100 and 200 of FIGS. 1 and 2 have the same reference numerals. The Docsis-MoCA coupled line directional coupler 300 may include the capacitor 304 and the trailing inductance 306, which may be the same as the corresponding elements in FIG. 2.

Figure 6:
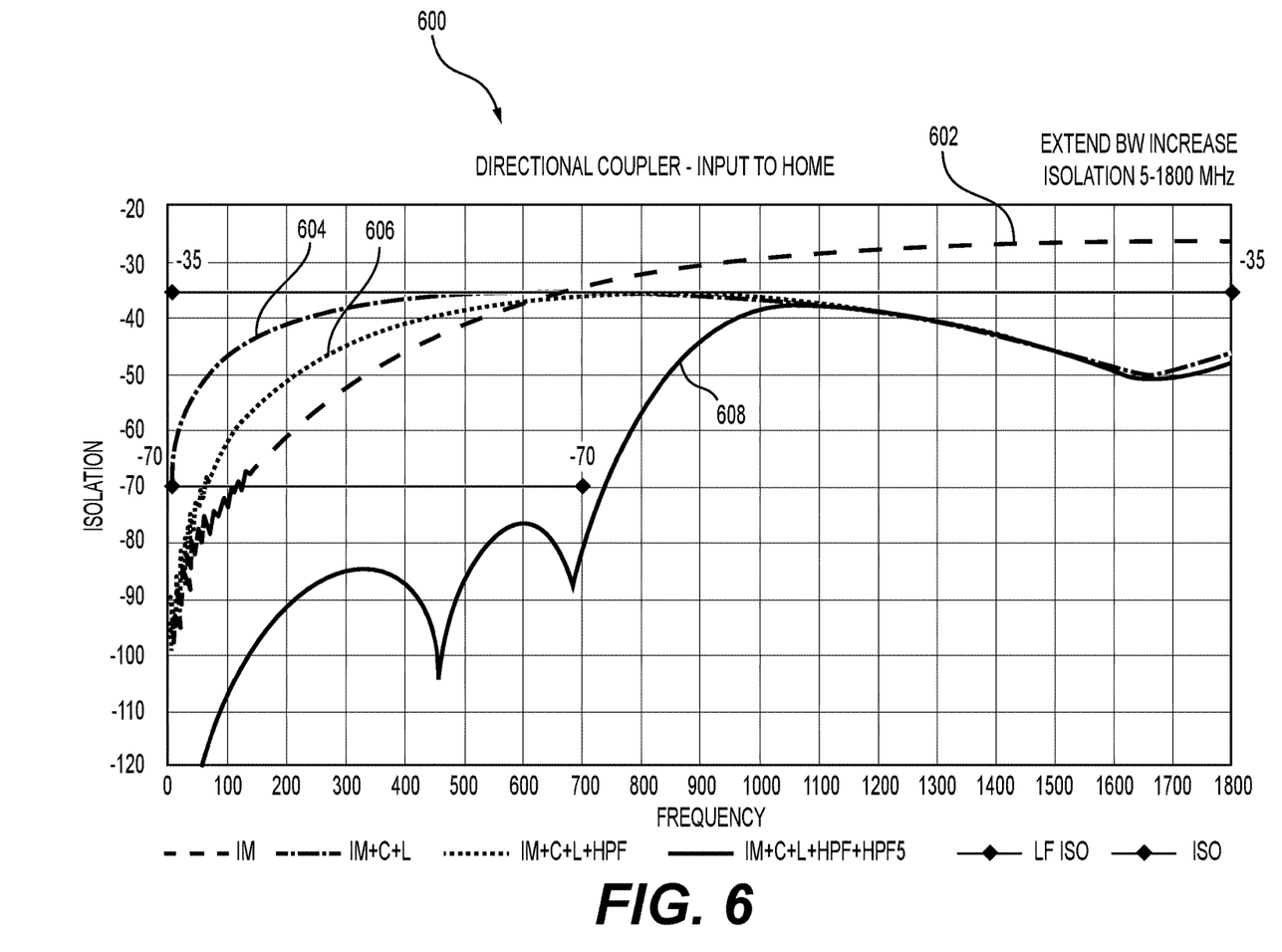
FIG. 6 illustrates a graph of the input port to coupled port isolation for the Docsis-MoCA coupled line directional coupler, in accordance with aspects of the present disclosure.

Additionally, the Docsis-MoCA coupled line directional coupler 300 includes a high pass filter 307 on the second track 112 composed of capacitor 308, inductor 310 and resistor 312. The high pass filter 307 provides the Docsis-MoCA coupled line directional coupler 300 with isolation between the input port 102 and the coupled port 108 of greater than about 70 dB in the frequency band of 5 MHz to 700 MHz, as shown in FIG. 6. The high pass filter 307 may be configured as a second order high pass filter.

Figure 4:
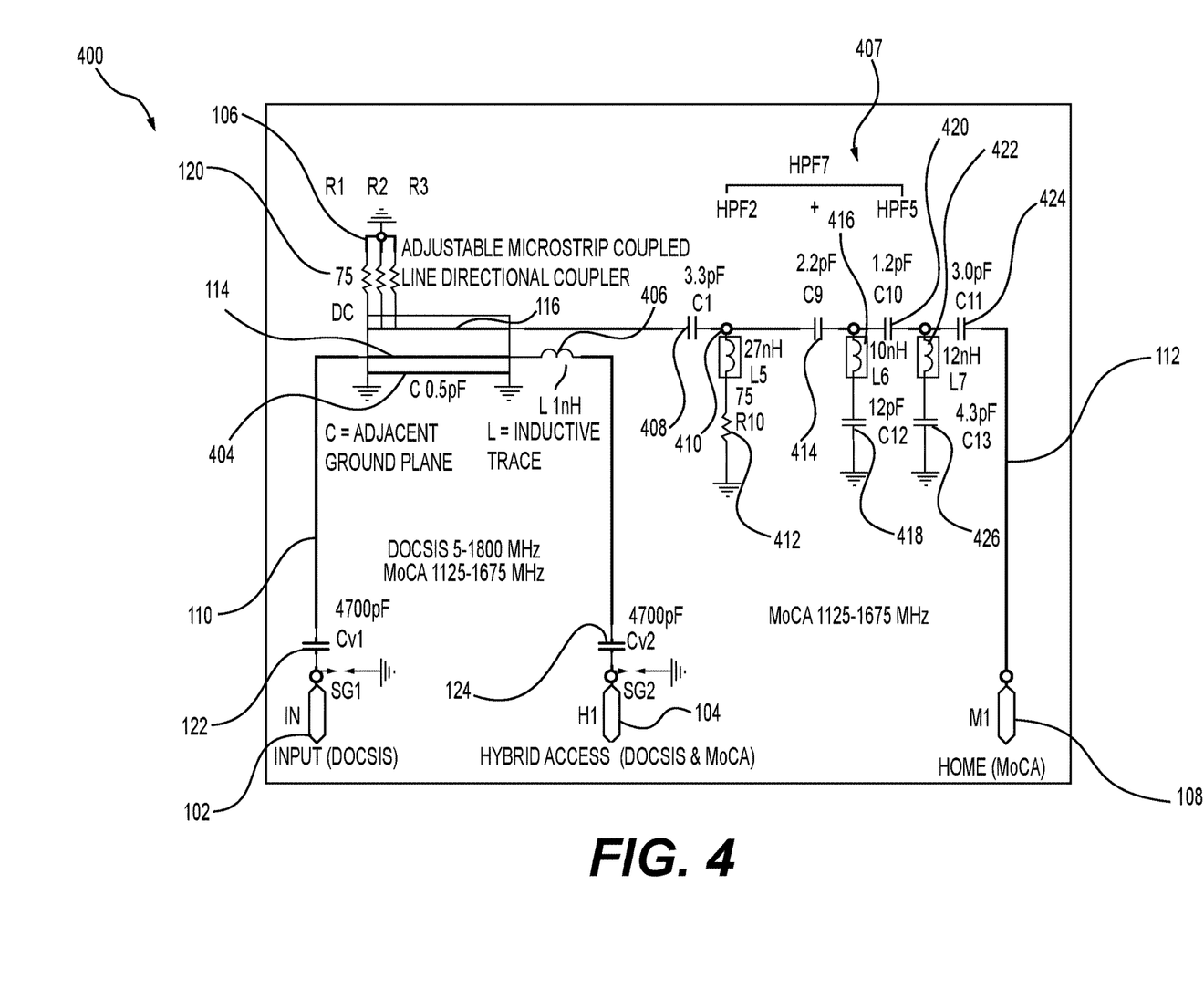
FIG. 4 illustrates an example Docsis-MoCA coupled line directional coupler in accordance with aspects of the present disclosure.

FIG. 4 illustrates an example Docsis-MoCA coupled line directional coupler 400 in accordance with aspects of the present disclosure. The Docsis-MoCA coupled line directional coupler 400 may be configured as a dual-frequency band coupled line directional coupler as discussed herein in conjunction with the embodiment of FIG. 1. Like elements of the Docsis-MoCA coupled line directional coupler 400 as compared to the Docsis-MoCA coupled line directional couplers 100, 200 and 300 of FIGS. 1-3 have the same reference numerals.

The Docsis-MoCA coupled line directional coupler 400 of FIG. 4 may have the capacitor 404 and the trailing inductance 406, which may be the same as the corresponding elements in FIG. 2. Additionally, the Docsis-MoCA coupled line directional coupler 400 may include a high pass filter 407. The high pass filter 407 may be a $7^{th}$ order high pass filter. The high pass filter may include capacitor 408, inductor 410, resistor 412, capacitor 414, inductor 416, capacitor 418, capacitor 420, inductor 422, capacitor 424 and capacitor 426. The high pass filter 307 may be configured to provide the Docsis-MoCA coupled line directional coupler 300 with isolation between the input port 102 and the coupled port 108 of less than about 70 dB in the frequency band of 5 MHz to 700 MHz, but with even better isolation and insertion loss performance as compared to the high pass filter 307, as further explained below.

The high pass filters 307 and 407 are possible high pass filter designs that provides the Docsis-MoCA coupled line directional coupler 400 with improved isolation between the input port 102 and the coupled port 108, although other high pass filter designs could be used.

Figure 5:
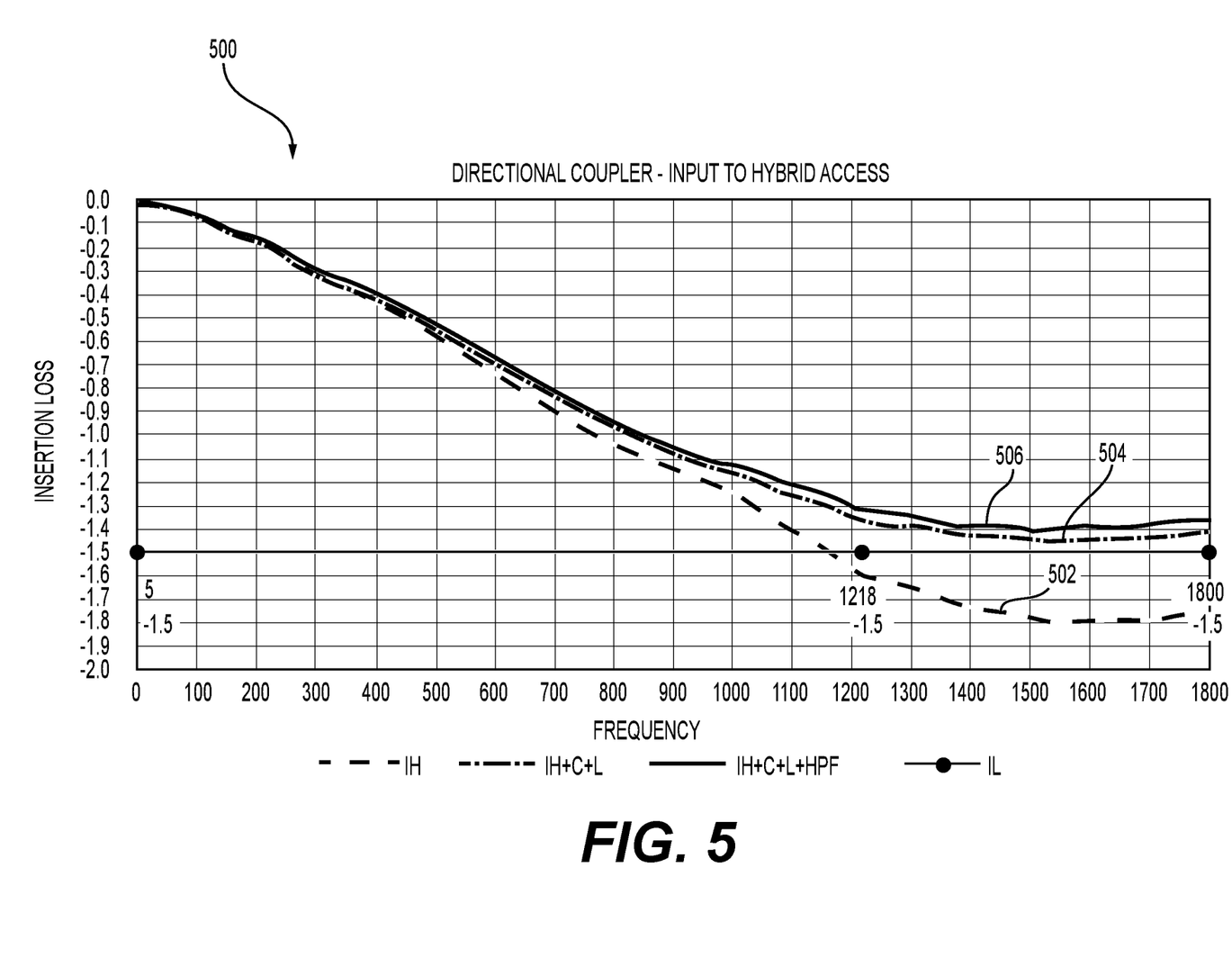
FIG. 5 illustrates a graph of the input port to output port insertion loss for the Docsis-MoCA coupled line directional coupler, in accordance with aspects of the present disclosure.

FIG. 5 illustrates a graph of input port to coupled port isolation at different frequencies for the embodiments of FIG. 1-4. Trace 502 illustrates insertion loss between the input port 102 and the output port 104 for the Docsis-MoCA coupled line directional coupler 100 of FIG. 1. The insertion loss increases to above 1.5 dB from about 1150 MHz to 1800 MHz.

Trace 504 illustrates insertion loss between the input port 102 and the output port 104 for the Docsis-MoCA coupled line directional coupler 200 of FIG. 2. The insertion loss is improved to less than about 1.5 dB from about 1150 MHz to 1800 MHz as compared to the Docsis-MoCA coupled line directional coupler 100 of FIG. 1.

Trace 506 illustrates insertion loss between the input port 102 and the output port 104 for the Docsis-MoCA coupled line directional couplers 300 and 400 of FIGS. 3 and 4. The insertion loss is again improved to less than about 1.5 dB from about 1150 MHz to 1800 MHz as compared to the Docsis-MoCA coupled line directional coupler 100 of FIG. 1 and is somewhat improved as compared to the Docsis-MoCA coupled line directional coupler 200 of FIG. 2.

FIG. 6 illustrates a graph of the input port to coupled port isolation for the Docsis-MoCA coupled line directional couplers 100, 200, 300 and 400. Trace 602 illustrates isolation between the input port 102 and the coupled port 108 for the Docsis-MoCA coupled line directional coupler 100 of FIG. 1. The isolation is greater than about 35 dB from about 700 MHz to 1800 MHz.

Trace 604 illustrates a graph of input port to coupled port isolation for the Docsis-MoCA coupled line directional coupler 200 of FIG. 2. The isolation is greater than about 35 dB from about 700 MHz to 1800 MHz and is improved as compared to the isolation in the FIG. 1 embodiment as illustrated in trace 602.

Trace 606 illustrates a graph of input port to coupled port isolation for the Docsis-MoCA coupled line directional coupler 300 of FIG. 3. The isolation is greater than about 35 dB from about 700 MHz to 1800 MHz and is improved as compared to the isolation in the FIG. 1 embodiment as illustrated in trace 602.

Trace 608 illustrates a graph of input port to coupled port isolation for the Docsis-MoCA coupled line directional coupler 400 of FIG. 4. The isolation is greater than about 35 dB from about 700 MHz to 1800 MHz and is improved as compared to the isolation in the FIG. 1 embodiment as illustrated in trace 602. Additionally, the input port to coupled port isolation is above about 70 dB in the frequency range of about 5 MHz to 700 MHz and is improved as compared to the isolation in the FIG. 1 embodiment as illustrated in trace 602.

Figure 7:
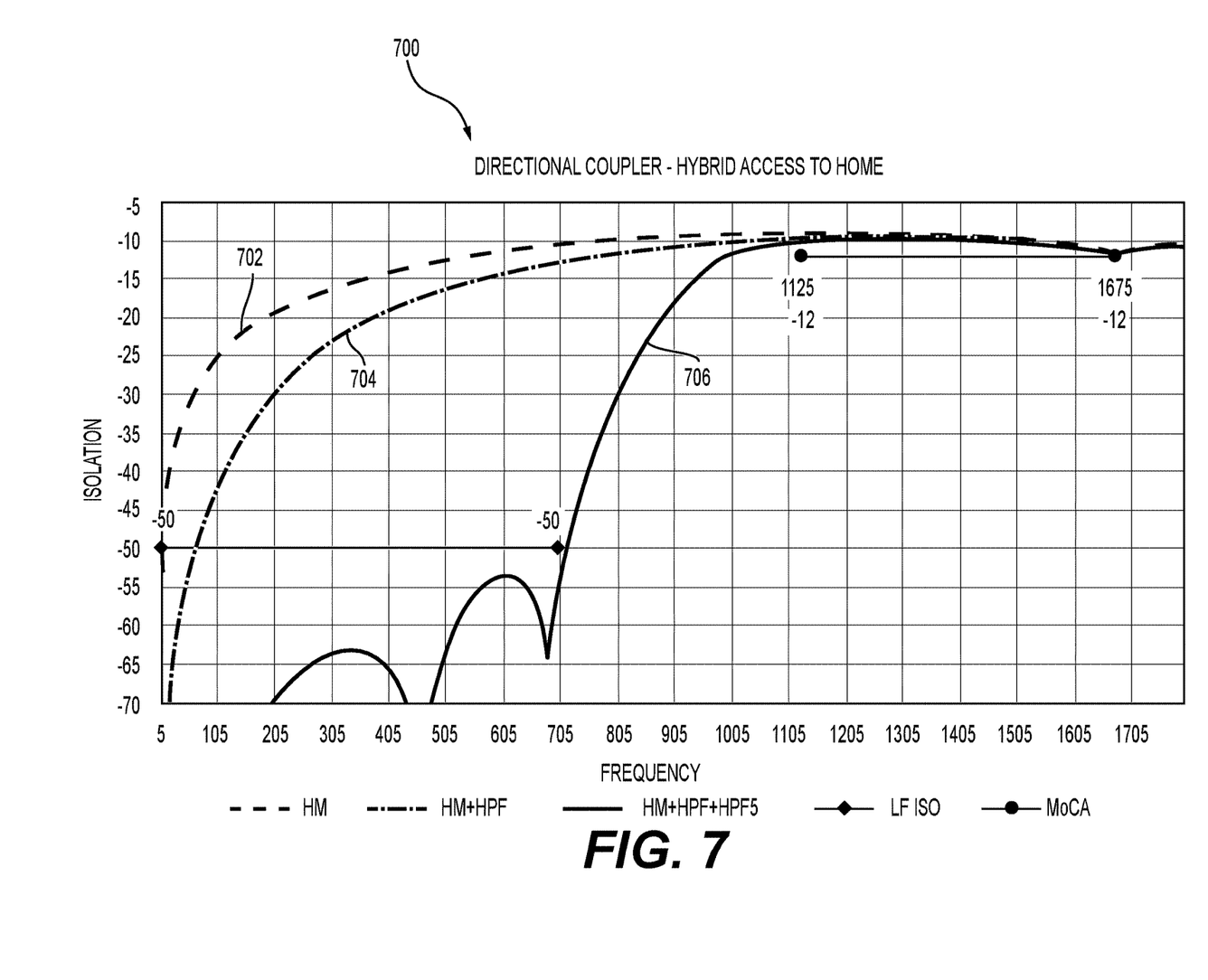
FIG. 7 illustrates a graph of the output port to coupled port isolation for the Docsis-MoCA coupled line directional coupler, in accordance with aspects of the present disclosure.

FIG. 7 illustrates a graph of the hybrid output port to coupled port isolation for the Docsis-MoCA coupled line directional couplers 100, 200, 300 and 400 in accordance with aspects of the present disclosure. Trace 702 illustrates hybrid output port 104 to coupled port 108 isolation for the Docsis-MoCA coupled line directional coupler 100 of FIG. 1. Trace 704 illustrates hybrid output port to coupled port isolation for the Docsis-MoCA coupled line directional coupler 300 of FIG. 3. The hybrid output port to coupled port isolation of trace 704 is enhanced in the frequency band of 5 MHz to 700 MHz as compared to trace 702. In the frequency band of 5 Hz to 600 MHz, the isolation is greater than 12 dB.

Trace 706 illustrates hybrid output port to coupled port isolation for the Docsis-MoCA coupled line directional coupler 400 of FIG. 4. As can be seen in FIG. 7, the hybrid output port to coupled port isolation of trace 706 is greater than 50 dB in the frequency range of 5 MHz to 700 MHz. Additionally, trace 706 shows an improved isolation between the output port and the coupled port to greater than 12 dB in the frequency range of 700 MHz to 1000 MHz as compared to traces 702 and 704.

As shown in FIGS. 5-7, the Docsis-MoCA coupled line directional coupler 200, 300 and 400 may produce enhanced performance results for the isolation levels and insertion loss in accordance with aspects of the present disclosure. Further, the results for the insertion loss and isolation levels can be adjusted by setting the spacing between the capacitor and the first track, providing an inductance on the first track and providing a high pass filter on the second track of the Docsis-MoCA coupled line directional coupler as described herein. While other factors can affect the isolation levels and insertion loss, such as the track widths, the gap width between the tracks, the thickness of the PCB, a resistance value of the resistor connecting the second track to ground, etc., these other factors can be set to nominal values, such as those described herein, and then the spacing between the capacitor and the first track can be set to provide the Docsis-MoCA coupled line directional coupler with desired levels of insertion loss between the input port and the output port. In addition, the inductance on the first track and the high pass filter on the second track can be configured to provide improved isolation levels as described herein across the Docsis and MoCA frequency bands, and across the dual-frequency band in embodiments of the dual-frequency band directional coupler.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A Docsis-MoCA directional coupler configured to provide an enhanced insertion loss, an enhanced return loss and an enhanced isolation, comprising:
    an input port, an output port, a coupled port, and a termination port;
    a first track configured to connect the input port with the output port;
    a second track configured to connect the termination port with the coupled port;
    a reactance including a capacitor element and an inductance, the capacitor element having a plate disposed substantially parallel to the first track and the inductance comprising a series inductance disposed at an end of the first track;
    a high pass filter disposed at an end of the second track;
    wherein a spacing between the plate of the capacitor element and the first track and a size of the series inductance are configured to provide an enhanced insertion loss level between the input port and the output port that is less than a predetermined insertion loss level at a first frequency band and to provide an enhanced return loss level between the input port and the output port that is greater than a predetermined return loss level;
    wherein the high pass filter is configured to provide an enhanced isolation level between the input port and the coupled port that is greater than a predetermined isolation level at a second frequency band;
    wherein the predetermined insertion loss level is about 1.5 dB and the first frequency band is about 5-1800 MHZ; and
    wherein the predetermined return loss level is about 18 dB.

2. The directional coupler of claim 1, wherein the high pass filter comprises a second order high pass filter and wherein the predetermined isolation level is about 35 dB and the second frequency band is about 700-1800 MHz.

3. The directional coupler of claim 1, wherein the spacing between the plate of the capacitor element and the second track is about 12 mil.

4. The directional coupler of claim 1, wherein the high pass filter comprises a seventh order high pass filter.

5. The directional coupler of claim 4, wherein the seventh order high pass filter is configured to provide the predetermined isolation level at about 70 dB at a frequency band of about 5 MHz to 700 MHz.

6. The directional coupler of claim 4, wherein the high pass filter is configured to provide an isolation level between the output port and the coupled port that is greater than about 50 dB in a frequency band of about 5 MHz to 700 MHZ;
    wherein the high pass filter is configured to provide a fourth predetermined isolation level between the input port and the coupled port that is less than a fourth predetermined isolation level in a fourth frequency band;
    wherein the third predetermined isolation level is about 50 dB; and
    wherein the fourth predetermined isolation level is about 12 dB and the fourth frequency band is about 1125 MHz to 1675 MHz.

7. A dual frequency band directional coupler configured to provide an enhanced insertion loss, an enhanced return loss and an enhanced isolation, comprising:
    an input port, an output port, a coupled port, and a termination port;
    a first track configured to connect the input port with the output port;
    a second track configured to connect the termination port with the coupled port;
    a reactance including a capacitor element, the capacitor element having a plate disposed substantially parallel to the first track;
    a high pass filter disposed at an end of the second track;
    wherein a spacing between the plate of the capacitor element and the first track is configured to provide an enhanced insertion loss level between the input port and the output port that is less than a predetermined insertion loss level at a first frequency band and to provide an enhanced return loss level between the input port and the output port that is greater than a predetermined return loss level;
    wherein the high pass filter is configured to provide an enhanced isolation level between the input port and the coupled port that is greater than a first predetermined isolation level at a second frequency band;
    wherein the predetermined insertion loss level is about 1.5 dB and the first frequency band is about 5-1800 MHZ; and
    wherein the predetermined return loss level is about 18 dB.

8. The dual-frequency band directional coupler of claim 7, wherein the first predetermined isolation level is about 35 dB and the second frequency band is about 700-1800 MHZ.

9. The dual-frequency band directional coupler of claim 7, wherein the reactance further comprises a series inductance disposed at an end of the first track.

10. The dual-frequency band directional coupler of claim 7, wherein the spacing between the plate of the capacitor element and the first track is configured to provide a predetermined isolation level between the input port and the coupled port.

11. The dual-frequency band directional coupler of claim 10, wherein the predetermined isolation level is greater than about 35 dB in a frequency band of about 700 MHz to 1800 MHZ.

12. The dual-frequency band directional coupler of claim 7, wherein the spacing between the plate of the capacitor element and the first track is configured to provide a return loss level between the input port and the output port that is greater than a predetermined return loss level.

13. The dual-frequency band directional coupler of claim 12, wherein the predetermined return loss level is about 18 dB.

14. The dual-frequency band directional coupler of claim 7, further comprising a second order high pass filter disposed at an end of the second track.

15. The dual-frequency band directional coupler of claim 14, wherein the second-order high pass filter, the spacing between the plate of the capacitor element and the first track are configured to provide a predetermined isolation level between the input port and the coupled port.

16. The dual-frequency band directional coupler of claim 15, wherein the predetermined isolation level is greater than about 35 dB in a frequency band of about 700-1800 MHz.

17. The dual-frequency band directional coupler of claim 7, further comprising a seventh order high pass filter disposed at an end of the second track.

18. The dual-frequency band directional coupler of claim 17, wherein the seventh order high pass filter and the spacing between the plate of the capacitor element and the first track are configured to provide a predetermined isolation level between the input port and the coupled port.

19. The dual-frequency band directional coupler of claim 18, wherein the predetermined isolation level between the input port and the coupled port is greater than about 70 dB at a frequency band of about 5 MHz to 700 MHz.

20. A dual-frequency band directional coupler configured to provide an enhanced insertion loss, comprising:
    an input port, an output port, a coupled port and a termination port;
    a first track configured to connect the input port with the output port;
    a second track configured to connect the termination port with the coupled port;
    a reactance including a capacitor element, the capacitor element having a plate disposed substantially parallel to the first track;
    wherein a spacing between the plate of the capacitor element and the first track is configured to provide an enhanced insertion loss level between the input port and the output port that is less than a predetermined insertion loss level; and
    wherein the predetermined insertion loss level is about 1.5 dB in a frequency band of about 5-1800 MHZ.

21. The dual-frequency band directional coupler of claim 20, wherein the reactance further comprises a series inductance disposed at an end of the first track.

22. The dual-frequency band directional coupler of claim 21, wherein the spacing between the plate of the capacitor element and the first track and a size of the series inductance are configured to provide the predetermined insertion loss level.

23. The dual-frequency band directional coupler of claim 21, wherein the spacing between the plate of the capacitor element and the first track and a size of the series inductance are configured to provide a predetermined isolation level between the input port and the coupled port.

24. The dual-frequency band directional coupler of claim 23, wherein the predetermined isolation level is greater than about 35 dB in a frequency band of about 700 MHz to 1800 MHZ.

25. The dual-frequency band directional coupler of claim 21, wherein the spacing between the plate of the capacitor element and the first track and a size of the series inductance are configured to provide a return loss level between the input port and the output port that is greater than a predetermined return loss level.

26. The dual-frequency band directional coupler of claim 25, wherein the predetermined return loss level is about 18 dB.

27. The dual-frequency band directional coupler of claim 21, further comprising a second order high pass filter disposed at an end of the second track.

28. The dual-frequency band directional coupler of claim 27, wherein the second-order high pass filter, the spacing between the plate of the capacitor element and the first track and a size of the series inductance are configured to provide a predetermined isolation level between the input port and the coupled port.

29. The dual-frequency band directional coupler of claim 28, wherein the predetermined isolation level is greater than about 35 dB in a frequency band of about 700-1800 MHz.

30. The dual-frequency band directional coupler of claim 21, further comprising a seventh order high pass filter disposed at an end of the second track.

31. The dual-frequency band directional coupler of claim 30, wherein the seventh order high pass filter, the spacing between the plate of the capacitor element and the first track and a size of the series inductance are configured to provide a predetermined isolation level between the input port and the coupled port.

32. The dual-frequency band directional coupler of claim 31, wherein the predetermined isolation level between the input port and the coupled port is greater than about 70 dB at a frequency band of about 5 MHz to 700 MHz.

* * * * *